Oct. 15, 1963 R. HIRSCHBERG 3,107,147
PROCESS FOR THE MANUFACTURE OF CHLORINE DIOXIDE
Filed June 28, 1962
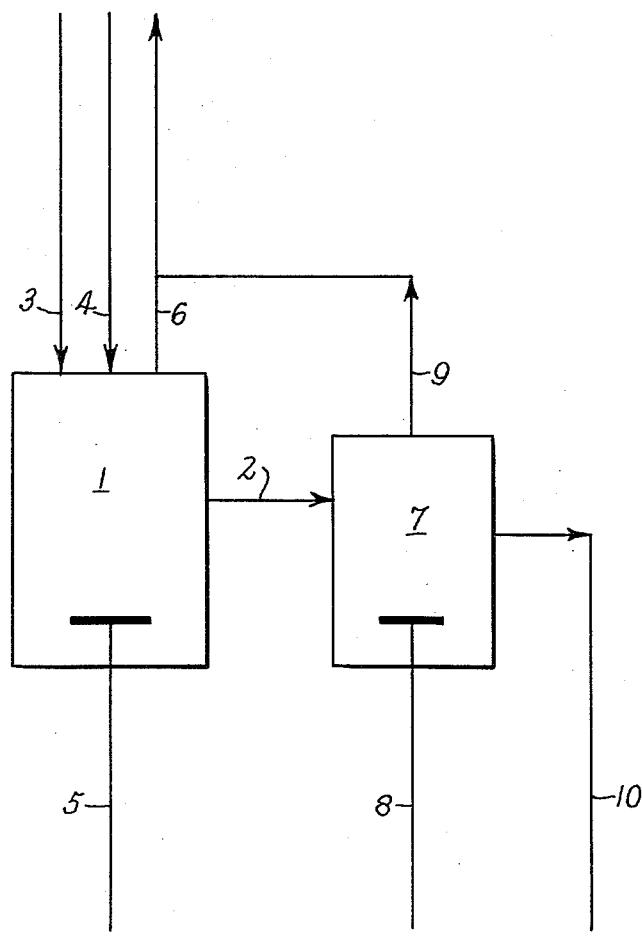
INVENTOR
Rudolf Hirschberg
BY
Curtis, Morris + Safford
ATTORNEYS United States Patent Office
3,107,147
Patented Oct. 15, 1963

3,107,147
PROCESS FOR THE MANUFACTURE OF
CHLORINE DIOXIDE
Rudolf Hirschberg, Frankfurt am Main, Germany, assignor to Farbwerke Hoechst Aktiengesellschaft vormals Meister Lucius & Brüning, Frankfurt am Main, Germany, a corporation of Germany
Filed June 28, 1962, Ser. No. 206,027
Claims priority, application Germany Nov. 9, 1957
4 Claims. (Cl. 23—152)

This application is a continuation-in-part of application Ser. No. 770,048 filed October 28, 1958, now abandoned.

The present invention relates to a process for the continuous manufacture of chlorine dioxide by the reaction of sodium chlorate with sulfur dioxide in sulfuric acid solution.

It is known to produce chlorine dioxide by reducing a chlorate, for example sodium chlorate, with sulfur dioxide in sulfuric acid solution. In this case, the formation of chlorine dioxide takes place according to the following reaction equations:

(1) $2NaClO_3 + H_2SO_4 \rightarrow 2HClO_3 + Na_2SO_4$
(2) $2HClO_3 + SO_2 \rightarrow 2ClO_2 + H_2SO_4$ (3) $2NaClO_3 + SO_2 \rightarrow 2ClO_2 + Na_2SO_4$ In addition to these reactions, side reactions occur to a greater or smaller extent in the reaction of chlorate with sulfur dioxide in sulfuric acid solution, which side reactions lead to the formation of chlorine or hydrogen chloride instead of chlorine dioxide and which may be formulated as follows:

(4) $ClO_2 + 2SO_2 + 2H_2O \rightarrow \frac{1}{2}Cl_2 + 2H_2SO_4$
(5) $ClO_2 + \frac{5}{2}SO_2 + 3H_2O \rightarrow HCl + \frac{5}{2}H_2SO_4$ The chlorine formed according to Equation 4 is partly removed with the chlorine dioxide formed according to Equation 2 while the hydrogen chloride formed according to Equation 5 remains in the reaction solution as hydrochloric acid and may further react, if its concentration is high enough, with the chlorate according to the following equations:

(6) $NaClO_3 + HCl + \frac{1}{2}H_2SO_4 \rightarrow$
$ClO_2 + \frac{1}{2}Cl_2 + \frac{1}{2}Na_2SO_4 + H_2O$
(7) $NaClO_3 + 5HCl + \frac{1}{2}H_2SO_4 \rightarrow 3Cl_2 + 3H_2O + \frac{1}{2}Na_2SO_4$ The chlorine dioxide formed according to Equation 6 may be converted into chlorine or hydrogen chloride according to Equation 4 or 5. Part of the chlorine obtained according to Equation 4 or 7 may furthermore be reduced to hydrogen chloride according to the following reaction equation:

(8) $Cl_2 + SO_2 + 2H_2O \rightarrow 2HCl + H_2SO_4$

The hydrogen chloride formed according to Equation 8 may react according to Equation 6 or 7 with the chlorate present in the reaction solution.

The reaction between chlorate and sulfur dioxide in sulfuric acid solution according to the above equations is very complicated because numerous individual reactions which play a decisive role are engaged in it. The reaction can therefore not be simply compared with other reactions in which chlorine dioxide is formed by a reduction of chlorate with other reducing agents, for example methanol or hydrochloric acid.

When carrying out in practice, in a discontinuous or continuous manner, the known processes for the manufacture of chlorine dioxide taking place according to the above equations it is impossible to eliminate completely reactions 4 and 8 which reduce the yield of chlorine dioxide. It is desirable, however, to reduce said reactions as far as possible with respect to the total reaction.

Now I have found that the aforesaid disadvantage can be avoided and chlorine dioxide can be prepared continuously by reacting sodium chlorate with sulfur dioxide in sulfuric acid solution with a considerably increased yield of $ClO_2$.

The present invention comprises a two-stage process for the continuous manufacture of chlorine dioxide which is carried out as follows:

Sodium chlorate, for example in its crystalline form or in the form of a concentrated aqueous solution containing, for example, 550 to 650 grams of $NaClO_3$ per liter, sulfuric acid and sulfur dioxide are continuously introduced into a reaction stage 1. The sulfur dioxide is supplied in a manner such that the stationary reaction solution in this stage has a constant sodium chlorate concentration within the range of 1.2 to 2.5 percent by weight, preferably of 1.5 to 2.0 percent by weight. A portion of the reaction solution corresponding to the amount of the sodium chlorate and sulfuric acid continuously added, and having the aforesaid sodium chlorate concentration of 1.2 to 2.5 percent by weight is continuously drawn off from reaction stage 1 and introduced into a second reaction stage into which such an amount of sulfur dioxide is continuously introduced that the chlorate concentration of the reaction solution in reaction stage 2 is always within the range of 0.1 to 0.8 percent by weight of $NaClO_3$, advantageously 0.2 to 0.6 percent by weight of $NaClO_3$. A part of the reaction solution of reaction stage 2 having the above mentioned chlorate concentration of 0.1 to 0.8 percent by weight, advantageously 0.2 to 0.6 percent by weight, and corresponding to the amount of solution continuously introduced from reaction stage 1 into reaction stage 2, is continuously removed from reaction stage 2 and allowed to flow off. The chlorine dioxide formed in both reaction stages is continuously removed from the said reaction stages and combined.

It is possible, for example, to adjust the velocity of flow of the chlorate-containing solution to the supply of the gaseous sulfur dioxide and the concentrations of the chlorate to the concentration of the sulfuric acid in the reaction solution in a manner such that in the first stage about 85 to about 95% and in the second stage about 15 to about 5% of the total amount of the chlorate is reacted.

The temperatures at which the two stages are carried out may vary between about 15° C. and about 60° C. and preferably between 30° C. and 50° C. It is of special advantage to carry out the process of the invention in a manner such that the amount of the chlorates reacted per liter of reaction solution ranges between about 0.3 and 0.5 mol of $ClO_3^-$ per hour in the first reaction stage and between about 0.01 and 0.1 mol of $ClO_3^-$ per hour in the second reaction stage.

The concentration of $H_2SO_4$ in the solution used in the process of the invention may vary within large limits. In general it is of advantage to operate with a solution having a concentration of $H_2SO_4$ within the range of about 35 and about 60 percent by weight. Solutions having larger or smaller concentrations of $H_2SO_4$ may, however, also be used.

The sulfur dioxide used is suitably diluted with air or another inert gas. It is of advantage to operate with gases having a $SO_2$ content in the range from about 0.5% to about 10%. It is likewise possible, however, to use gases having a content of $SO_2$ outside the aforesaid range.

U.S. Patent 2,881,052 already discloses a multistage process for reducing chlorate in the presence of sulfuric acid by the action of a reducing agent to obtain chlorine dioxide. The said patent describes, however, in detail only the use of methanol as a reducing agent and points out that it is advantageous for an efficient operation to use at least three reaction stages, i.e. three reactors in which the manufacture of chlorine dioxide is carried out. In the reaction solution of the first reaction stage of this known process, a chlorate concentration of 3 to 9 percent by weight of $ClO_3$ is maintained. This mode of proceeding has, however, the great disadvantage that a considerable proportion of the chlorate supplied to the process flows, without being reacted, together with the discharged liquid from the first stage into the second stage where, owing to the lower chlorate concentration, smaller yields of chlorine dioxide calculated on the chlorate reacted in the second stage are obtained. For example, according to Example 1 of the said U.S. patent, a concentration of 3.6 percent by weight of $ClO_3$ is used in the first reaction stage and a concentration of 0.6 percent by weight of $ClO_3$ is used in the second reaction stage so that the ratio between the chlorate reacted in the first stage and the chlorate reacted in the second stage amounts to about 3.5:1. From the first stage a gas mixture escapes which contains 96.3 parts by volume of chlorine dioxide and 3.7 parts by volume of chlorine. Correspondingly, in the second stage a gas mixture is formed which contains 89 parts by volume of chlorine dioxide and 11 parts by volume of chlorine. The yield of chlorine dioxide calculated on the chlorate reacted in the first and in the second stages, respectively, thus amounts to at most 92.6% in the first stage and to at most 78% in the second stage. The discharge loss of chlorate which arises on account of the fact that chlorate-containing solution still flows off from the second stage, amounts to 3.7% of the chlorate supplied to the process. From this a total yield of chlorine dioxide of about 86%, calculated on the chlorate supplied to the process is calculated.

In contradistinction thereto, the process of the invention enables the ratio of the chlorate reacted in the first stage to the chlorate reacted in the second stage to be kept within the range of 5:1 to 20:1, preferably of 10:1 to 20:1. As compared with the process of the above mentioned U.S. Patent 2,881,052 using methanol as the reducing agent, in the process of the invention a considerably smaller portion of the chlorate used as a starting material need be reacted with low chlorate concentrations which are as such more unfavorable. When, for example, in the process of the invention a chlorate concentration of about 2.0 percent by weight of $NaClO_3$ is maintained in the first stage, a gas mixture is obtained which contains 1.5 parts by volume of chlorine per 98.5 parts by volume of chlorine dioxide, so that the yield of chlorine dioxide obtained in the first stage amounts to about 97% calculated on the chlorate used as a starting material. Correspondingly, with a sodium chlorate concentration of 0.4 to 0.6 percent by weight of $NaClO_3$ in the reaction solution of the second stage, a gas mixture is obtained in the second stage which contains 5.4 parts by volume of chlorine per 94.6 parts by volume of chlorine dioxide. This corresponds to a yield of chlorine dioxide of about 89% calculated on the chlorate reacted in that stage. The discharge loss of chlorate which arises on account of the fact that chlorate-containing solution still flows off from the second stage, amounts to about 1.4%. In addition thereto, the liquid discharged contains also chloride formed by reduction from the chlorate supplied to the process, the amount of the said chloride corresponding to about 0.8% of the chlorate supplied to the process. By the process of the invention, a total yield of chlorine dioxide of about 94%, calculated on the total amount of chlorate supplied to the process, is thus obtained, as compared with 86% obtained by the multi-stage process using methanol as a reducing agent.

In addition to the high yield of chlorine dioxide, the process of the invention offers the further advantage that the yield of chlorine dioxide is relatively less sensitive to variations in the sodium chlorate concentration of the reaction solutions which are produced, for example, by an irregular supply of the reaction components. It may be assumed, for example, that a $NaClO_3$ concentration of 2.0 percent by weight is used in the first reaction stage and that the ratio of the amount of $NaClO_3$ reacted in the first stage to that reacted in the second stage is 10:1. If, for example owing to an unintentional reduction of the amount of chlorate supplied, the chlorate content of the reaction solution in the first stage decreases to 1.0 percent by weight, the following new results are obtained, provided that the other conditions remain constant:

(1) The ratio of the amount of $NaClO_3$ reacted in the first stage to that reacted in the second stage is increased to 20:1.

(2) The yield of $ClO_2$, calculated on the chlorate supplied to the process, is reduced from about 94.0% to 90.1%.

Hence, the yield of $ClO_2$ has been reduced by only about 4.0%, although the chlorate content of the reaction solution of the first stage has been reduced by 50%.

The accompanying drawing represents diagrammatically a device suitable for carrying out the process of the invention. In the drawing 1 represents a reaction vessel provided with overflow vessel 2. Reaction vessel 1 is continuously charged at 3 and 4 with chlorate or chlorate solution and sulfuric acid in a suitable concentration. Air or another gas containing about 2 to 6 percent by volume of $SO_2$ is continuously injected, by means of gas-distributing device 5, into the reaction solution in vessel 1 which solution is allowed to flow off continuously via overflow vessel 2. Care is taken by means of controls that the concentration of $NaClO_3$ in vessel 1 varies constantly between 1.2 and 2.5 percent by weight. The gas mixture formed containing chlorine dioxide is discharged at 6. The reaction solution flowing off via overflow vessel 2 enters the second reaction vessel 7 where it is treated again, with the aid of gas-distributing device 8, with an amount of inert gas containing 2 to 6 percent by volume of $SO_2$ such that the solution has constantly a concentration below 0.8 percent by weight of $NaClO_3$, and preferably a concentration of $NaClO_3$ in the range from 0.2 to 0.6 percent by weight. The resulting gas mixture containing chlorine dioxide is discharged at 9 and combined with the gas current leaving vessel 1 while the practically exhausted reaction solution is allowed to flow off via overflow vessel 10.

The following example serves to illustrate the invention but it is not intended to limit it thereto.

*Example*

Reaction vessels 1 and 7 have a capacity of 180 and 40 liters, respectively. Vessel 1 is charged, per hour, with 5.8 kilograms of sodium chlorate in the form of an aqueous solution having a specific gravity of 1.386 (20° C.), corresponding to about 650 grams of $NaClO_3$ per liter, and with 16.2 kilograms of $H_2SO_4$ of about 53.0% strength by weight. Simultaneously, about 17 m.$^3$ per hour of a mixture of air and sulfur dioxide containing about 4.0% by volume of $SO_2$ are introduced into the liquid in vessel 1. The reaction solution has a temperature of about 32° C., a density of about 1.4 kilograms per liter and a content of sodium chlorate in the range from 1.5 to 1.8% by weight of $NaClO_3$. The reaction solution flowing from vessel 1 into vessel 7 is contacted in vessel 7 with about 1.6 m.$^3$ per hour of air containing about 4.0% by volume of $SO_2$. The reaction solution in vessel 7 also has a temperature of about 32° C. and a density of about 1.4 kilograms per liter. The sodium chlorate content varies between about 0.4 and 0.6% by weight of $NaClO_3$. The gas mixtures flowing off per hour from vessels 1 and 7, respectively, contain 3.27 kilograms and 0.29 kilogram, respectively, of $ClO_2$ and furthermore chlorine in a proportion to the chlorine dioxide contained in the gas mixture of 1.5 parts by volume of chlorine to 98.5 parts by volume of chlorine dioxide and 5.4 parts by volume of chlorine to 94.6 parts by volume of chlorine dioxide, respectively. The solution flowing off per hour from vessel 7 contains 81 grams of $NaClO_3$ and chloride in an amount corresponding to 49 grams of $NaClO_3$. The total discharge loss is therefore composed of 1.4% of discharge loss in the form of chlorate and 0.8% of discharge loss in the form of chloride.

I claim:

1. A two-stage process for the continuous manufacture of chlorine dioxide which comprises continuously reacting in a first stage sodium chlorate in an aqueous solution of sulfuric acid with an amount of sulfur dioxide such that a chlorate concentration of 1.2 to 2.5 percent by weight is maintained in the reaction solution of said first stage, and continuously removing the chlorine dioxide formed in said first stage; continuously discharging a portion of the reaction solution from the first stage to a second stage in an amount corresponding to the amount of the chlorate and the sulfuric acid continuously added to the first stage; contacting said discharged reaction solution which contains 1.2 to 2.5 percent by weight of chlorate in the second stage again with an amount of sulfur dioxide such that a chlorate concentration of 0.15 to 0.8 percent by weight is maintained in the reaction solution of said second stage, and removing the chlorine dioxide formed in said second stage, the temperature in said first and second stages being between 15° C. and 50° C.

2. A process as claimed in claim 1, wherein a chlorate concentration of 0.2 to 0.6 percent by weight is maintained in the reaction solution of the second stage.

3. A process as claimed in claim 1, wherein the velocity of flow of the chlorate-containing reaction solution is adjusted to the supply of sulfur dioxide and the concentration of the chlorate to the concentration of sulfuric acid in the reaction solution so that in the first stage about 85 to 95% and in the second stage about 15 to 5% of the total amount of chlorate contained in the reaction solution is reacted.

4. A process as claimed in claim 1, wherein in the first reaction stage 0.3 to 0.5 mol of $ClO_3^-$ and in the second stage 0.01 to 0.1 mol of $ClO_3^-$ are reacted per liter and per hour.

References Cited in the file of this patent

UNITED STATES PATENTS 2,376,935      Persson  ---------------  May 29, 1945